United States Patent
Weissman et al.

(10) Patent No.: US 11,888,905 B2
(45) Date of Patent: Jan. 30, 2024

(54) SYSTEMS AND METHODS FOR PRESERVING MEDIA STREAMS

(71) Applicant: Meta Platforms, Inc., Menlo Park, CA (US)

(72) Inventors: Jake Weissman, Scarsdale, NY (US); Maxwell Sergio Gomez, New York, NY (US); Jorge Cenzano Ferret, Seattle, WA (US); Ethan Aaron Benowitz, Denver, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 21 days.

(21) Appl. No.: 17/396,469

(22) Filed: Aug. 6, 2021

(65) Prior Publication Data
US 2023/0040592 A1    Feb. 9, 2023

(51) Int. Cl.
*H04L 65/1083*    (2022.01)
*H04L 67/148*    (2022.01)

(52) U.S. Cl.
CPC ........ *H04L 65/1083* (2013.01); *H04L 67/148* (2013.01)

(58) Field of Classification Search
CPC .................................................. H04L 65/1083
See application file for complete search history.

(56) References Cited

U.S. PATENT DOCUMENTS

| | | | | |
|---|---|---|---|---|
| 9,183,266 B2 * | 11/2015 | Hopkins | ............... | G06F 3/0484 |
| 11,272,005 B1 * | 3/2022 | Blaszka | ................. | H04L 67/34 |
| 11,750,715 B2 * | 9/2023 | Mazur | ...................... | H04L 67/12 |
| 2011/0289222 A1 * | 11/2011 | Scheibel | ............ | H04L 65/4025 709/227 |
| 2012/0060052 A1 * | 3/2012 | White | ................. | G06F 11/2025 714/E11.01 |
| 2013/0007518 A1 * | 1/2013 | George | ................. | H04L 67/146 707/827 |
| 2018/0241825 A1 * | 8/2018 | Bolton | .................... | H04L 67/01 |
| 2019/0104128 A1 * | 4/2019 | Carol | ................ | H04L 63/0428 |
| 2019/0222640 A1 * | 7/2019 | Tock | ...................... | G06F 9/542 |
| 2020/0344498 A1 * | 10/2020 | Lazar | ................... | H04N 21/234 |
| 2021/0314665 A1 * | 10/2021 | Davenport | ......... | H04N 21/2743 |
| 2023/0035177 A1 * | 2/2023 | Batista | .................. | H04L 65/612 |
| 2023/0140388 A1 * | 5/2023 | Lin | ..................... | G06F 13/4282 710/105 |

OTHER PUBLICATIONS

International Search report and Written Opinion for International Application No. PCT/US2022/039655, dated Nov. 18, 2022, 8 pages.

\* cited by examiner

*Primary Examiner* — Dhairya A Patel
(74) *Attorney, Agent, or Firm* — Greenberg Traurig, LLP (57) ABSTRACT

A computer-implemented method for preserving media streams may include (i) identifying a media stream transmitted by a client device to a server that hosts the media stream for access by additional devices, (ii) detecting that the server is expected to go offline, (iii) sending, in response to detecting that the server is expected to go offline, a message to the client device indicating that the server is expected to go offline, (iv) receiving, at an additional server, a request from the client device to host the media stream, and (v) in response to receiving the request, hosting the media stream at the additional server while ceasing to host the media stream at the server that is expected to go offline. Various other methods, systems, and computer-readable media are also disclosed.

20 Claims, 5 Drawing Sheets

SYSTEMS AND METHODS FOR PRESERVING MEDIA STREAMS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for preserving media streams that may otherwise be disconnected when infrastructure components such as servers go offline for maintenance or other reasons. In one example, a social media platform may enable users to stream live video and/or audio from their video-enabled devices to their social connections (friends, groups, etc.). For the duration of the live broadcast, the social media platform may maintain a connection to the client using any type of transport protocol, such as a lossless user datagram protocol (UDP) connection and/or a transmission control protocol (TCP) connection, and may use the connection to stream the media content. However, operational policies for operating system installation patching or other maintenance may assume network components can be taken offline after a short period of no longer accepting new requests (e.g., 45 minutes), referred to as a "draining" period. If a media stream is longer than the duration of the draining period, the stream may still be running when the server is taken offline, resulting in lost data or even lost streams.

To solve this problem, the systems described herein may send a "reconnect now" message to clients when a server is about to go offline. In some embodiments, the systems described herein may configure the client to, upon receipt of this message, launch a new connection to a different server. In one embodiment, the systems described herein may send a reconnection message designed to avoid causing errors for clients that do not support the reconnection protocol. Additionally or alternatively, the systems described herein may configure clients to send a "supports reconnection" message when initiating a stream and may only send reconnection messages to clients from which this message has been received. In some examples, the client may change over the stream at a logical boundary to minimize disruption to the stream. In some embodiments, the client may send a session identifier with the reconnect request that enables backend systems to track the use of reconnection.

In some embodiments, the systems described herein may improve the functioning of a computing device by enabling a computing device to stream media without a loss of connection caused by infrastructure components going offline. Additionally, the systems described herein may improve the functioning of a computing device by enabling an infrastructure component to be taken offline for maintenance without disrupting media streams. Additionally, the systems described herein may improve the fields of live media streaming and/or network infrastructure maintenance by enable infrastructure components to be taken offline for maintenance without disrupting and/or dropping live media streams that are initially hosted by the infrastructure components in question.

Figure 1:
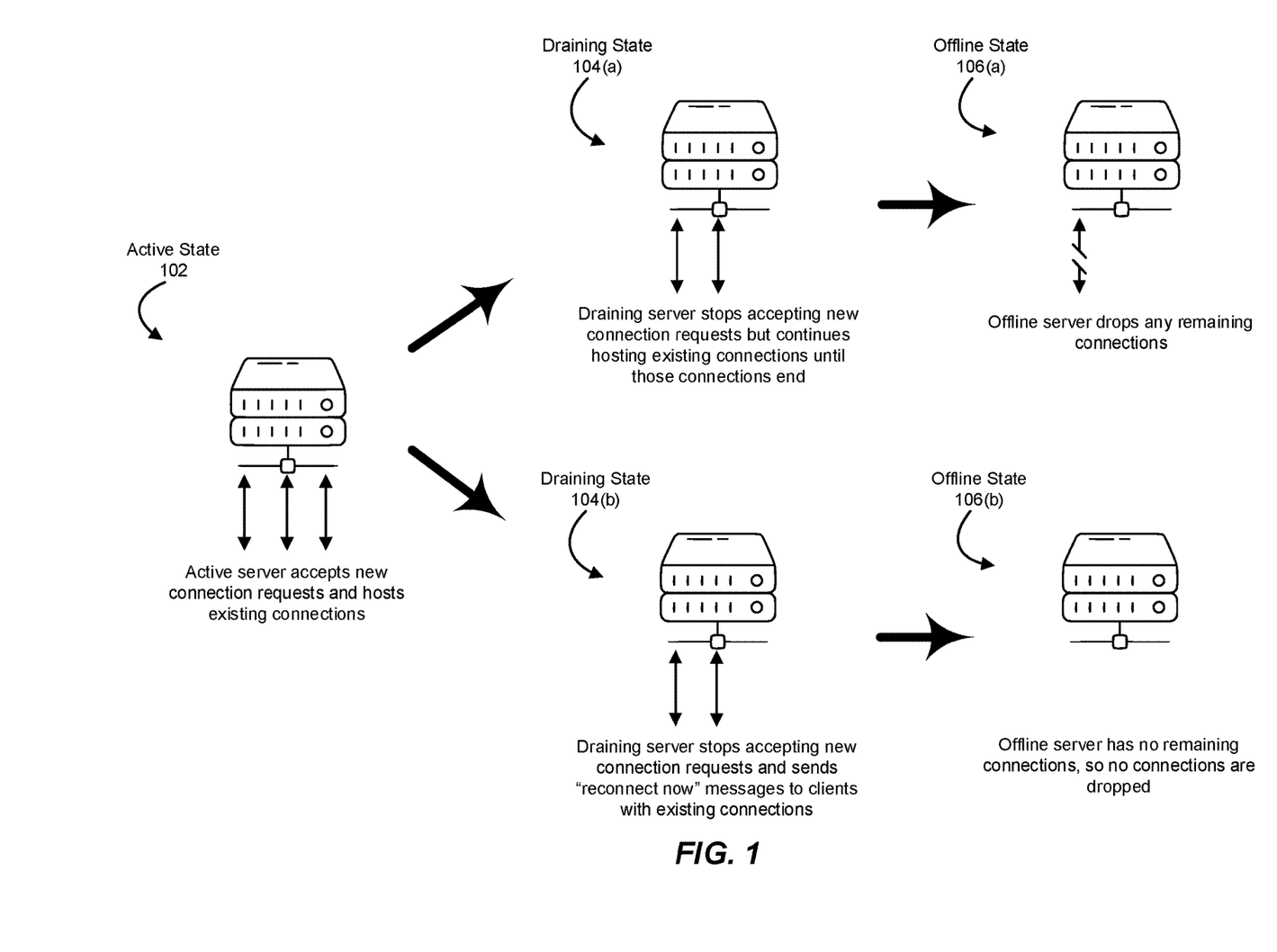
FIG. 1 is an illustration of an exemplary system for preserving media streams.

The following will provide, with reference to FIG. 1, detailed descriptions of the problem solved by preserving media streams via sending "reconnect now" signals from servers that are about to go offline. Additionally, detailed descriptions of systems and methods for preserving media streams will be provided with reference to FIGS. 2 and 3-4, respectively. Detailed descriptions of a timeline for preserving media streams via sending a "reconnect now" message will be provided in connection with FIG. 5.

In some embodiments, the systems described herein may prevent connections from being disrupted and/or lost when servers or other infrastructure components go offline (e.g., for planned maintenance). For example, as illustrated in FIG. 1, in active state 102, an active server may accept new connection requests and host existing connections. At some point, the server may send or receive a signal indicating that the server is expected to go offline within the near future. For example, the server may be expected to go offline in a predetermined period of time, such as ten minutes, thirty minutes, forty-five minutes, or one hour. In one example, in draining state 104(*a*), a draining server may stop accepting new connection requests but may continue hosting existing connections until those connections end (e.g., due to being terminated by the client). In some examples, when the server enters offline state 106(*a*), some existing connections may not yet have ended. For example, a live video stream of a three-hour-long concert may not end during a draining period of forty-five minutes. In these examples, the offline server may drop any remaining connections. In some cases, the client may re-establish the connection to another server after several seconds of disruption, while in other cases, the client may not re-establish the connection and the stream may be lost. Either way, the disrupted and/or dropped stream may be a sub-optimal experience for users who are transmitting, viewing, and/or recording the media stream.

By contrast, if a server is configured according to the systems described herein, when the server enters draining state 104(*b*), the draining server may stop accepting new connection requests as per draining state 104(*a*) but, unlike in draining state 104(*a*), may send "reconnect now" messages to clients with existing connections. In some embodiments, the server may send the messages as soon as the server enters the draining state, while in other embodiments the server may send the messages at a predetermined time point before the server goes offline. For example, a server may stop accepting new connections one hour before planned maintenance and may send "reconnect now" messages five minutes before the planned maintenance. In one embodiment, when a server enters offline state 106(*b*) from draining state 104(*b*), the offline server may no longer have any remaining connections due to all existing connections having been terminated by the clients connecting to a different server after receiving "reconnect now" message, and no connections may be dropped.

Figure 2:
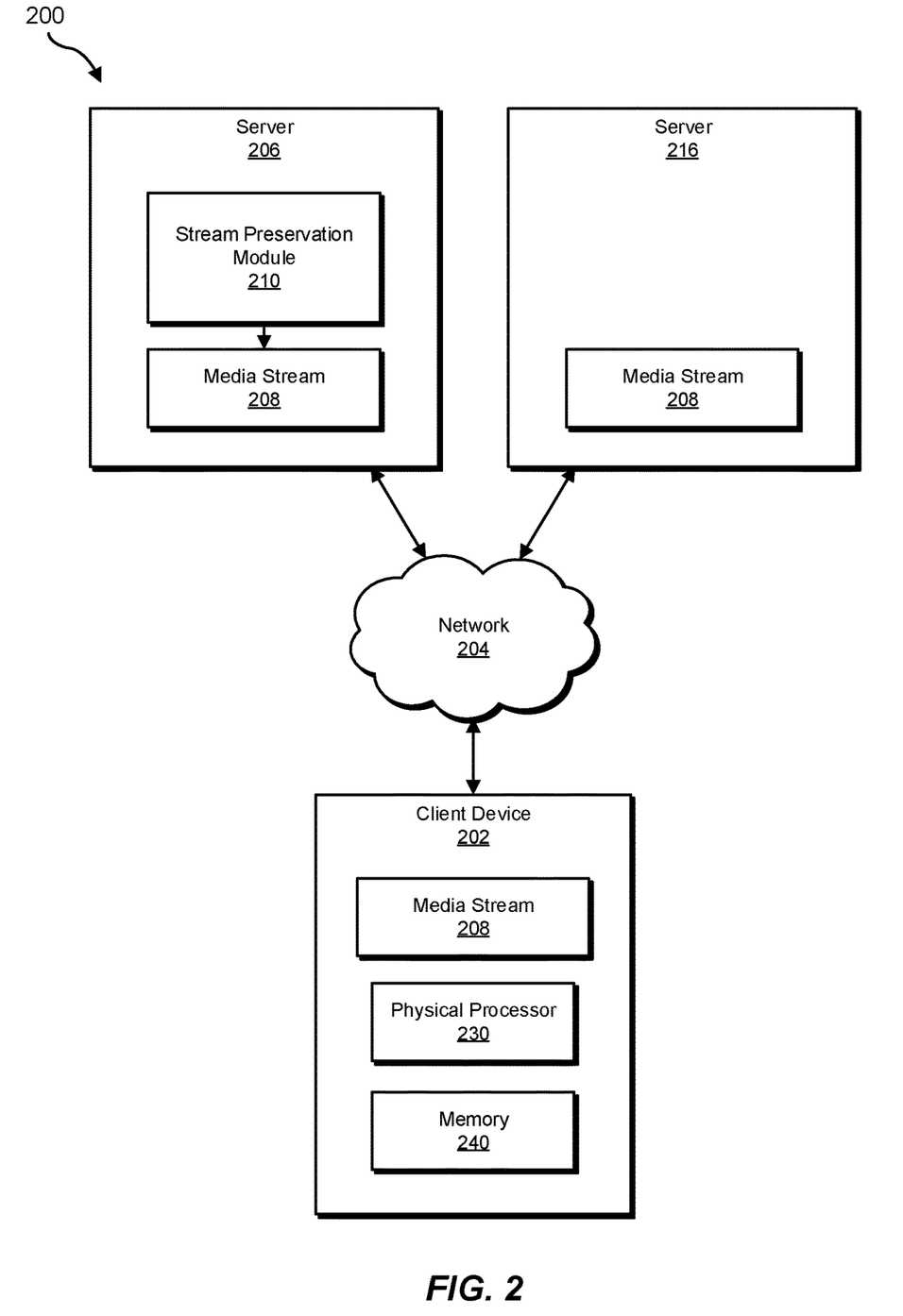
FIG. 2 is a block diagram of an exemplary system for preserving media streams.

In some embodiments, the systems described herein may be implemented on one or more servers and/or clients. FIG. 2 is a block diagram of an exemplary system 200 for preserving media streams. In one embodiment, and as will be described in greater detail below, a server 206 may be configured with a stream preservation module 210 that may detect that server 206 is hosting media stream 208 transmitted by a client device 202 (e.g., via a network 204) and is expected to go offline and, in response to detecting that server 206 is expected to go offline, may notify client device 202 that server 206 is expected to go offline. In response to this notification, client device 202 may send a request to a server 216 to host media stream 208 and may begin transmitting media stream 208 to server 216 instead of server 206.

Servers 206 and/or 216 generally represent any type or form of backend computing device that may host media streams. Examples of server 206 may include, without limitation, media servers, application servers, database servers, and/or any other relevant type of server. Although illustrated as independent entities in FIG. 2, server 206 and/or server 216 represent a group of multiple servers that operate in conjunction with one another (e.g., as part of a media hosting platform and/or social networking platform).

Client device 202 generally represents any type or form of computing device capable of reading computer-executable instructions. For example, client device 202 may represent a mobile computing device such as a smart phone. Additional examples of client device 202 may include, without limitation, a laptop, a desktop, a wearable device, a network-capable camera device, a smart device, an artificial reality device, a personal digital assistant (PDA), etc.

Media stream 208 generally represents any type or form of streaming digital media. In some embodiments, media stream 208 may include streaming video. Additionally or alternatively, media stream 208 may include streaming audio metadata, and/or timed metadata (e.g., captions, subtitles, timecode information, etc.). In some examples, media stream 208 may be a live media stream being captured in real-time (e.g., by client device 202). For example, media stream 208 may be a live stream of a performance, sporting event, social event, political event, and/or any other type of event. In another example, media stream 208 may be a video and/or audio call between two or more participants.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of the modules illustrated in FIG. 2. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of the modules stored in memory 240. Additionally or alternatively, physical processor 230 may execute one or more of the modules. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 3:
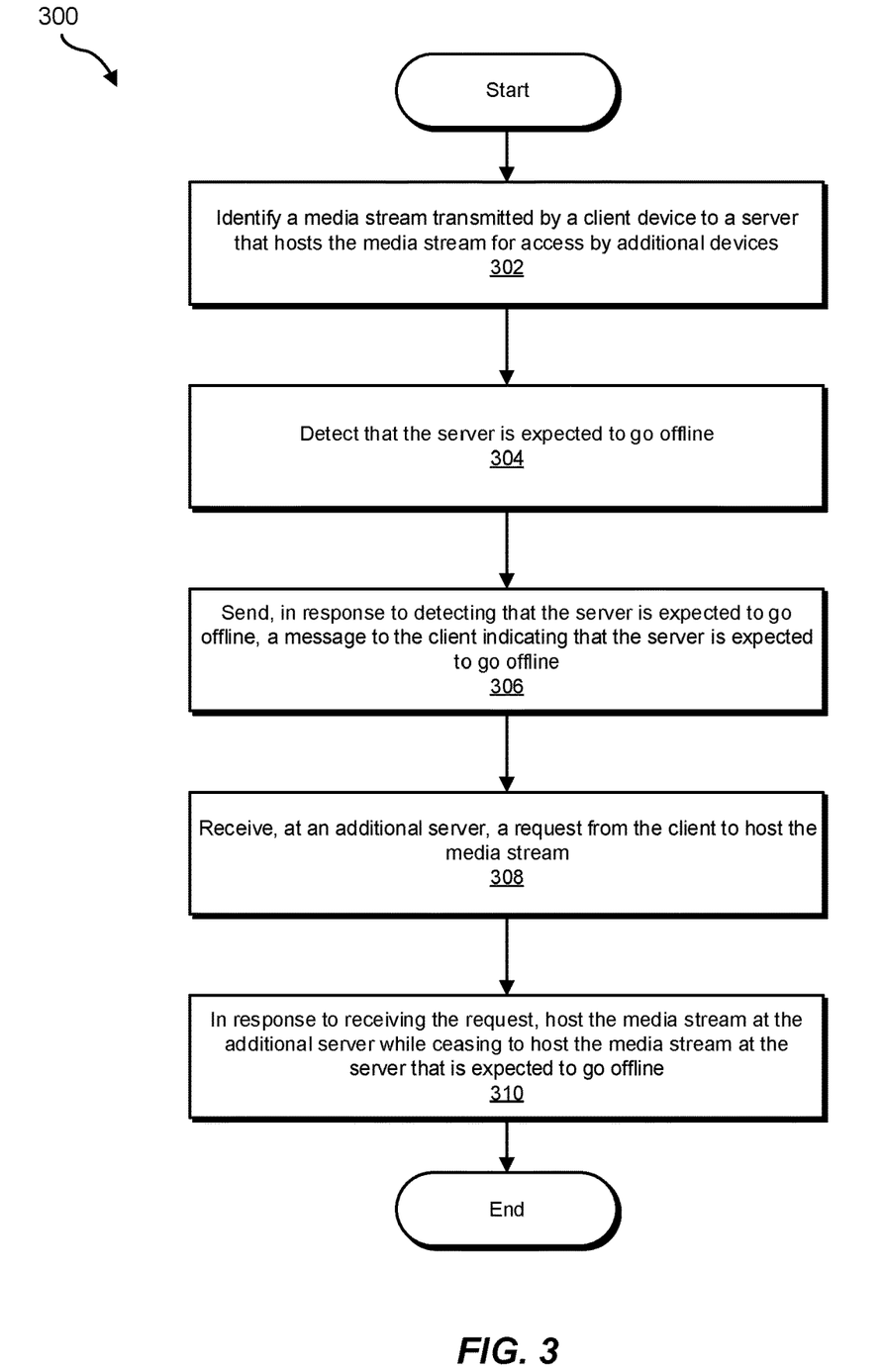
FIG. 3 is a flow diagram of an exemplary method for preserving media streams from the server perspective.

FIG. 3 is a flow diagram of an exemplary method 300 for preserving media streams as described from the server perspective. In some examples, at step 302, the systems described herein may identify a media stream transmitted by a client device to a server that hosts the media stream for access by additional devices. The systems described herein may identify a media stream in a variety of ways and/or contexts. For example, the systems described herein may identify a live video stream being transmitted by a smart phone to a social media platform via a TCP connection using real time messaging protocol (RTMP). At step 304, one or more of the systems described herein may detect that the server is expected to go offline. The systems described herein may determine that the server is expected to go offline in a variety of ways. For example, the systems described herein may detect that the server is expected to go offline in five minutes for scheduled maintenance. In one example, the systems described herein may monitor the maintenance schedule of servers. Additionally or alternatively, the systems described herein may detect when a server has stopped accepting new connection requests.

At step 306, one or more of the systems described herein may send, in response to detecting that the server is expected to go offline, a message to the client indicating that the server is expected to go offline. The systems described herein may send the message in a variety of ways. For example, the systems described herein may send an RTMP message with the command name set to "ReconnectNow" to the client device. In some embodiments, the command object field of the message may a include "SessionId" and/or a "TimeRemaining" field. In some examples, "TimeRemaining" may tell the client how long they have to reconnect and/or "SessionId" may be a string that the client will be expected to send in conjunction with the client's new connection request.

At step 308, one or more of the systems described herein may receive, at an additional server, a request from the client to host the media stream. The systems described herein may receive the request in a variety of ways. For example, another server that hosts media streams for the same social networking platform as the original server may receive a new connection request from the client. In some examples, the new connection request may initiate a TCP handshake (e.g., similar to a TCP handshake used to initiate the original connection). At step 310, in response to receiving the request, the systems described herein may host the media stream at the additional server while ceasing to host the media stream at the server that is expected to go offline. The systems described herein may host the media stream in a variety of ways. For example, the additional server may host a live video stream of an event, enabling the stream to continue without disruption while the original server goes offline for maintenance. In some examples, the systems described herein may cease hosting the media stream at the server that is expected to go offline because the client may have ceased transmitting the media stream to that server.

Figure 4:
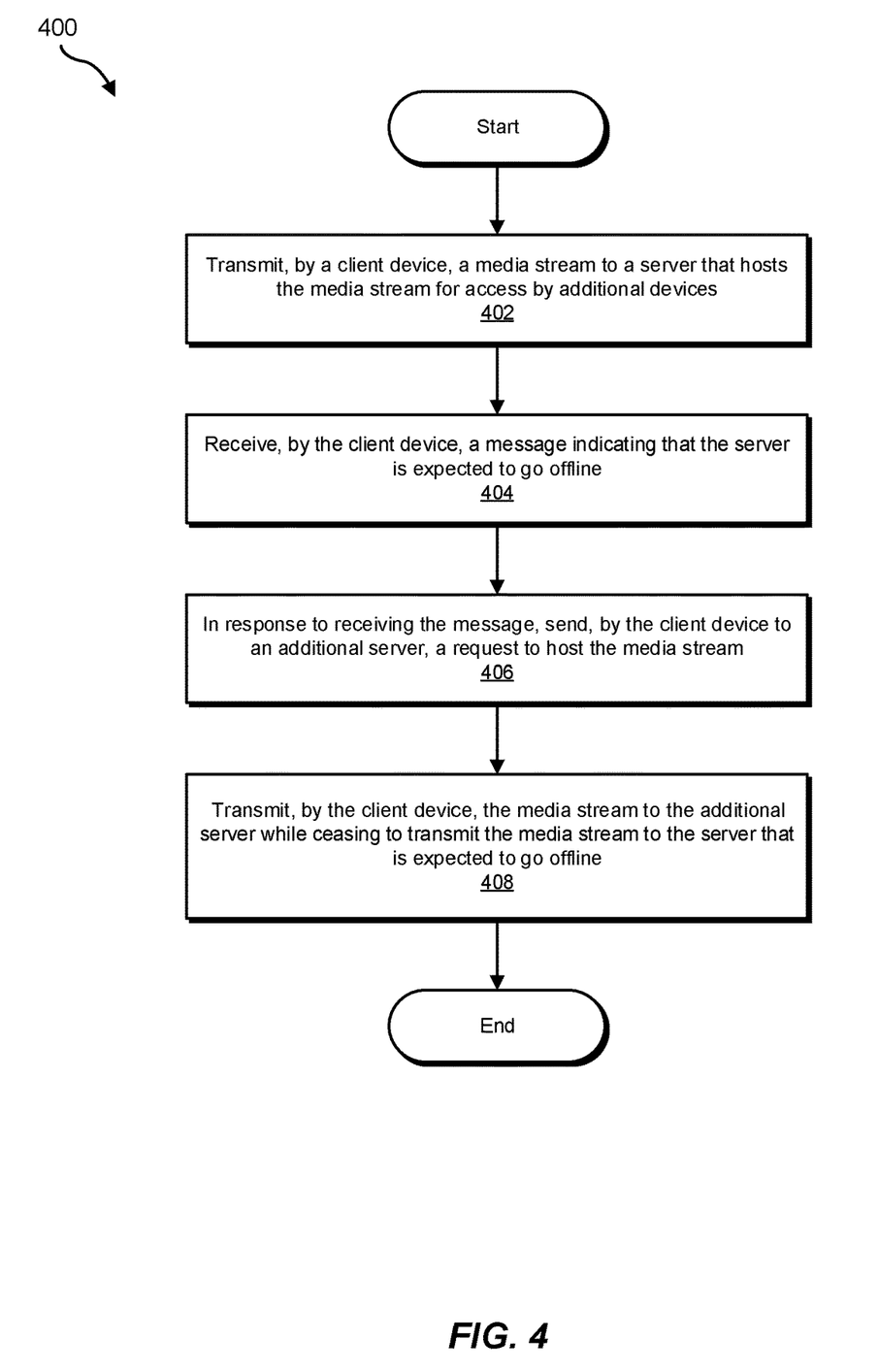
FIG. 4 is a flow diagram of an exemplary method for preserving media streams from the client perspective.

In some embodiments, the systems described herein may configure a client device (e.g., by configuring an application on the client device that streams media). FIG. 4 is a flow diagram of an exemplary method 400 for preserving media streams as described from the client perspective. As illustrated in FIG. 4, at step 402, one or more of the systems described herein may transmit, by a client device, a media stream to a server that hosts the media stream for access by additional devices. The client device may transmit the media stream in a variety of ways and/or contexts. For example, a smart phone may transmit a live video stream to a social networking platform for access by devices operated by social media connections of the smart phone's operator. In some examples, the smart phone may transmit the live video stream via a TCP connection. At step 404, one or more of the systems described herein may receive, by the client device, a message indicating that the server is expected to go offline. The client device may receive the message in a variety of ways. In some examples, the client device may receive the message via the same connection and/or protocol the client is using to transmit the media stream. For example, a smart phone may receive a RTMP command message with "ReconnectNow" in the command name field. In some examples, the RTMP message may include a include "SessionId" and/or a "TimeRemaining" field that may tell the client how long it has to reconnect and/or include a string that the client will be expected to send in conjunction with the client's new connection request, respectively.

At step 406, one or more of the systems described herein may transmit, by the client device, the media stream to the additional server while ceasing to transmit the media stream to the server that is expected to go offline. The client device may transition the media stream to a new server in a variety of ways. For example, upon receiving the "ReconnectNow" message, the client may create a new connection to the same platform (e.g., the same virtual Internet Protocol address) as previously. In some examples, the client may find a logical segment boundary in the video data to switch over to the new connection. In one example, the client may switch at an instantaneous decoder refresh (IDR) frame to ensure that no subsequent video frames reference any frames from previous segments, reducing the chances of any disruption to the media stream.

In some embodiments, upon reconnecting, the client may send an additional RTMP command message with the command name set to "ReconnectSuccess." In one embodiment, this message may have a command object containing a field "SessionId" set to the session identifier received from the server in the "ReconnectNow" message. This information may enable the server to attribute a successful reconnection to the reconnect message feature.

Figure 5:
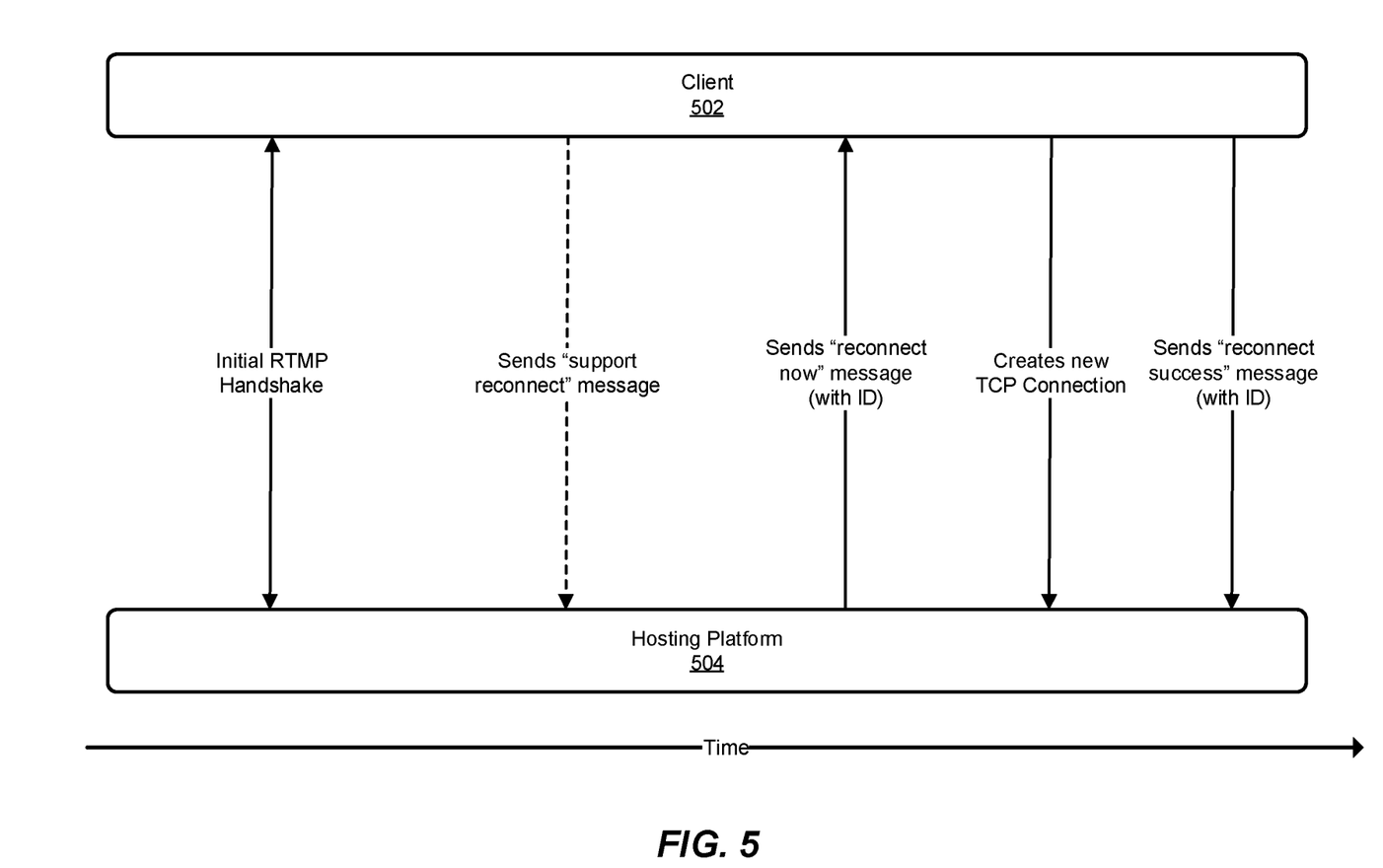
FIG. 5 is an illustration of an exemplary timeline of a system for preserving media streams.

In some embodiments, the systems described herein may cause a series of messages to be sent between participating servers and clients at various points in the media streaming process. For example, as illustrated in FIG. 5, a client 502 may perform an initial RTMP handshake with a server that is part of a hosting platform 504. The client may then begin transmitting a media stream to the server. In one embodiment, the client may send a "supports reconnect" message to the server. For example, the client may send an RTMP command message with "SupportsReconnect" as the command name. In some embodiments, the server may mark the media stream and/or client 502 as supporting reconnection messages.

At some point during the media stream, an element of hosting platform 504 (e.g., a stream preservation module on one or more servers) may detect that the server to which client 502 is connected is about to go offline. In response, the server may send a "reconnect now" message to client 502. In some examples, the "reconnect now" message may include an identifier for the media streaming session. In some embodiments, the server may only send the "reconnect now" message to client 502 if the server has previously received a "supports reconnect" message from client 502. Additionally or alternatively, the "reconnect now" message may be designed to ensure that legacy clients (e.g., clients that do not support reconnect messages) are not negatively impacted (e.g., do not crash) upon receiving the message.

After receiving the reconnection message, client 502 may create a new TCP connection with an additional server within hosting platform 504. In some embodiments, client 502 may then send a "reconnect success" message that includes the session identifier previously provided by the prior server, enabling hosting platform 504 to track how many media streams are impacted by the reconnect message feature.

As described above, the systems and methods described herein may preserve media streams by signaling to clients that a server is about to go offline, enabling the client to reconnect to a new server and transition at a logical boundary rather than gracelessly dropping the client connection, resulting in disrupted and/or dropped streams. By designing the reconnect message to avoid negatively impacting legacy clients and/or only sending the reconnect message to clients which have affirmatively sent a message indicating they support reconnect messages, the systems described herein may improve the video streaming experience for all clients.

Example Embodiments

Example 1: A method for preserving streams may include (i) identifying a media stream transmitted by a client device to a server that hosts the media stream for access by additional devices, (ii) detecting that the server is expected to go offline, (iii) sending, in response to detecting that the server is expected to go offline, a message to the client indicating that the server is expected to go offline, (iv) receiving, at an additional server, a request from the client to host the media stream, and (v) in response to receiving the request, hosting the media stream at the additional server while ceasing to host the media stream at the server that is expected to go offline.

Example 2: The computer-implemented method of example 1, where the media stream may include a live media stream being captured in real-time by the client device.

Example 3: The computer-implemented method of examples 1-2, where the media stream may include a video stream.

Example 4: The computer-implemented method of examples 1-3, where detecting that the server is expected to go offline includes detecting that the server is expected to go offline within a predetermined window of time and sending the message includes sending the message in response to detecting that the server is expected to go offline within the predetermined window of time.

Example 5: The computer-implemented method of examples 1-4, where detecting that the server is expected to go offline may include detecting that the server is scheduled for upcoming maintenance.

Example 6: The computer-implemented method of examples 1-5, where detecting that the server is expected to go offline may include detecting that the server has ceased accepting new connection requests.

Example 7: The computer-implemented method of examples 1-6, where sending the message to the client indicating that the server is expected to go offline may include determining that the server has previously received a message from the client indicating that the client device supports reconnection suggestion messages.

Example 8: The computer-implemented method of examples 1-7, where the message to the client indicating that the server is expected to go offline includes an expected time at which the server is expected to go offline.

Example 9: The computer-implemented method of examples 1-8, where the message to the client indicating that the server is expected to go offline includes a session identifier associated with the media stream.

Example 10: The computer-implemented method of examples 1-9, where identifying the media stream transmitted by the client device to the server may include identifying that the client device is transmitting the media stream via a transmission control protocol.

Example 11: The computer-implemented method of examples 1-10, where the transmission control protocol is a real time messaging protocol.

Example 12: The computer-implemented method of examples 1-11, where sending the message to the client indicating that the server is expected to go offline may include sending the message via the transmission control protocol.

Example 13: A method for preserving video streams may include (i) transmitting, by a client device, a media stream to a server that hosts the media stream for access by additional devices, (ii) receiving, by the client device, a message indicating that the server is expected to go offline, (iii) in response to receiving the message, sending, by the client device to an additional server, a request to host the media stream, and (iv) transmitting, by the client device, the media stream to the additional server while ceasing to transmit the media stream to the server that is expected to go offline.

Example 14: The system of example 13, where transmitting the media stream to the server may include sending, by the client device, a message to the server indicating that the client device accepts reconnection suggestion messages.

Example 15: The system of examples 13-14 may further include sending, to the additional server, a session identifier associated with the media stream.

Example 16: The system of examples 13-15, where, the message indicating that the server is expected to go offline includes the session identifier and sending, to the additional server, the session identifier associated with the media stream includes sending the session identifier received from the server.

Example 17: The system of examples 13-16, where transmitting, by the client device, the media stream to the additional server while ceasing to transmit the media stream to the server that is expected to go offline may include avoiding data loss by switching, by the client device, transmitting the media stream from the server to the additional server at a segment boundary within the media stream.

Example 18: A system for preserving media streams may include (i) a client device that transmits a media stream, (ii) a server that hosts the media stream for access by additional devices, (iii) a stream preservation module that (a) detects that the server that hosts the media stream is expected to go offline and (b) in response to detecting that the server is expected to go offline, notifies the client device that the server is expected to go offline, and (iv) an additional server that receives a request from the client to host the media stream and hosts the media stream.

Example 19: The system of example 18, where the media stream includes a live video stream being captured in real-time by the client device.

Example 20: The system of examples 18-19, where the client device sends the server a message indicating that the client device accepts reconnection messages, the stream preservation module notifies the client device that the server is expected to go offline in response to detecting that the client device sent the server the message, and the client device, in response to being notified by the stream preservation module that the server is expected to go offline, sends the request to the additional server to host the media stream.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying a media stream transmitted from a client device to a server that hosts the media stream for access by additional devices;
   prior to instructing the client device to connect to an additional server that is managed by a platform, receiving, from the client device and at the platform, a confirmation message indicating that the client device supports mid-stream reconnection;
   detecting that the server is expected to go offline;
   instructing the client device to connect to the additional server at least in part by sending, in response to detecting that the server is expected to go offline and based on receiving the confirmation message at the platform, a message to the client device indicating that the server is expected to go offline;
   prior to the server going offline:
      receiving, at the additional server, a reconnect request from the client device to host the media stream; and
      in response to receiving the reconnect request, hosting the media stream at the additional server while ceasing to host the media stream at the server that is expected to go offline.

2. The computer-implemented method of claim 1, wherein the media stream comprises a live media stream being captured in real-time by the client device.

3. The computer-implemented method of claim 1, wherein the media stream comprises a video stream.

4. The computer-implemented method of claim 1, wherein:
   detecting that the server is expected to go offline comprises detecting that the server is expected to go offline within a predetermined window of time; and
   sending the message comprises sending the message in response to detecting that the server is expected to go offline within the predetermined window of time.

5. The computer-implemented method of claim 1, wherein detecting that the server is expected to go offline comprises detecting that the server is scheduled for upcoming maintenance.

6. The computer-implemented method of claim 1, wherein detecting that the server is expected to go offline comprises detecting that the server has ceased accepting new connection requests.

7. The computer-implemented method of claim 1, wherein the reconnect request comprises a session identifier associated with the media stream.

8. The computer-implemented method of claim 1, wherein the message to the client device indicating that the server is expected to go offline comprises an expected time at which the server is expected to go offline.

9. The computer-implemented method of claim 1, wherein the message to the client device indicating that the server is expected to go offline includes a session identifier associated with the media stream.

10. The computer-implemented method of claim 1, wherein identifying the media stream transmitted by the client device to the server comprises identifying that the client device is transmitting the media stream via a transmission control protocol.

11. The computer-implemented method of claim 10, wherein the transmission control protocol comprises a real time messaging protocol.

12. The computer-implemented method of claim 10, wherein sending the message to the client device indicating that the server is expected to go offline comprises sending the message via the transmission control protocol.

13. A computer-implemented method comprising:
   transmitting, from a client device, a media stream to a server that hosts the media stream for access by additional devices;
   prior to receiving, at the client device, instructions to connect to an additional server that is managed by a platform, sending, from the client device and to the platform, a confirmation message indicating that the client device supports mid-stream reconnection;

receiving, by the client device and based on sending the confirmation message to the platform, an instruction to connect to the additional server, the instruction comprising a message indicating that the server is expected to go offline;

in response to receiving the message and prior to the server going offline:
  sending, by the client device to the additional server, a reconnect request to host the media stream; and
  transmitting, by the client device, the media stream to the additional server while ceasing to transmit the media stream to the server that is expected to go offline.

14. The computer-implemented method of claim 13, wherein transmitting the media stream to the server comprises sending, by the client device, a message to the server indicating that the client device accepts reconnection suggestion messages.

15. The computer-implemented method of claim 13, further comprising sending, to the additional server, a session identifier associated with the media stream.

16. The computer-implemented method of claim 15, wherein:
  the message indicating that the server is expected to go offline includes the session identifier; and
  sending, to the additional server, the session identifier associated with the media stream comprises sending the session identifier received from the server.

17. The computer-implemented method of claim 13, wherein transmitting, by the client device, the media stream to the additional server while ceasing to transmit the media stream to the server that is expected to go offline comprises avoiding data loss by switching, by the client device, transmitting the media stream from the server to the additional server at a segment boundary within the media stream.

18. A system comprising:
  a client device that transmits a media stream;
  a server that hosts the media stream for access by additional devices;
  a stream preservation module that:
    prior to instructing the client device to connect to an additional server that is managed by a platform, receives, from the client device, a confirmation message indicating that the client device supports mid-stream reconnection;
    detects that the server that hosts the media stream is expected to go offline; and
    in response to detecting that the server is expected to go offline and based on receiving the confirmation message from the client device, instructs the client device to connect to the additional server by notifying the client device that the server is expected to go offline; and
  wherein the additional server, prior to the server going offline:
  receives a reconnect request from the client device to host the media stream; and
  hosts the media stream.

19. The system of claim 18, wherein the media stream comprises a live video stream being captured in real-time by the client device.

20. The system of claim 18, wherein:
  the client device sends the server a message indicating that the client device accepts reconnection messages;
  the stream preservation module notifies the client device that the server is expected to go offline in response to detecting that the client device sent the server the message; and
  the client device, in response to being notified by the stream preservation module that the server is expected to go offline, sends the reconnect request to the additional server to host the media stream.

* * * * *